Figure 1:
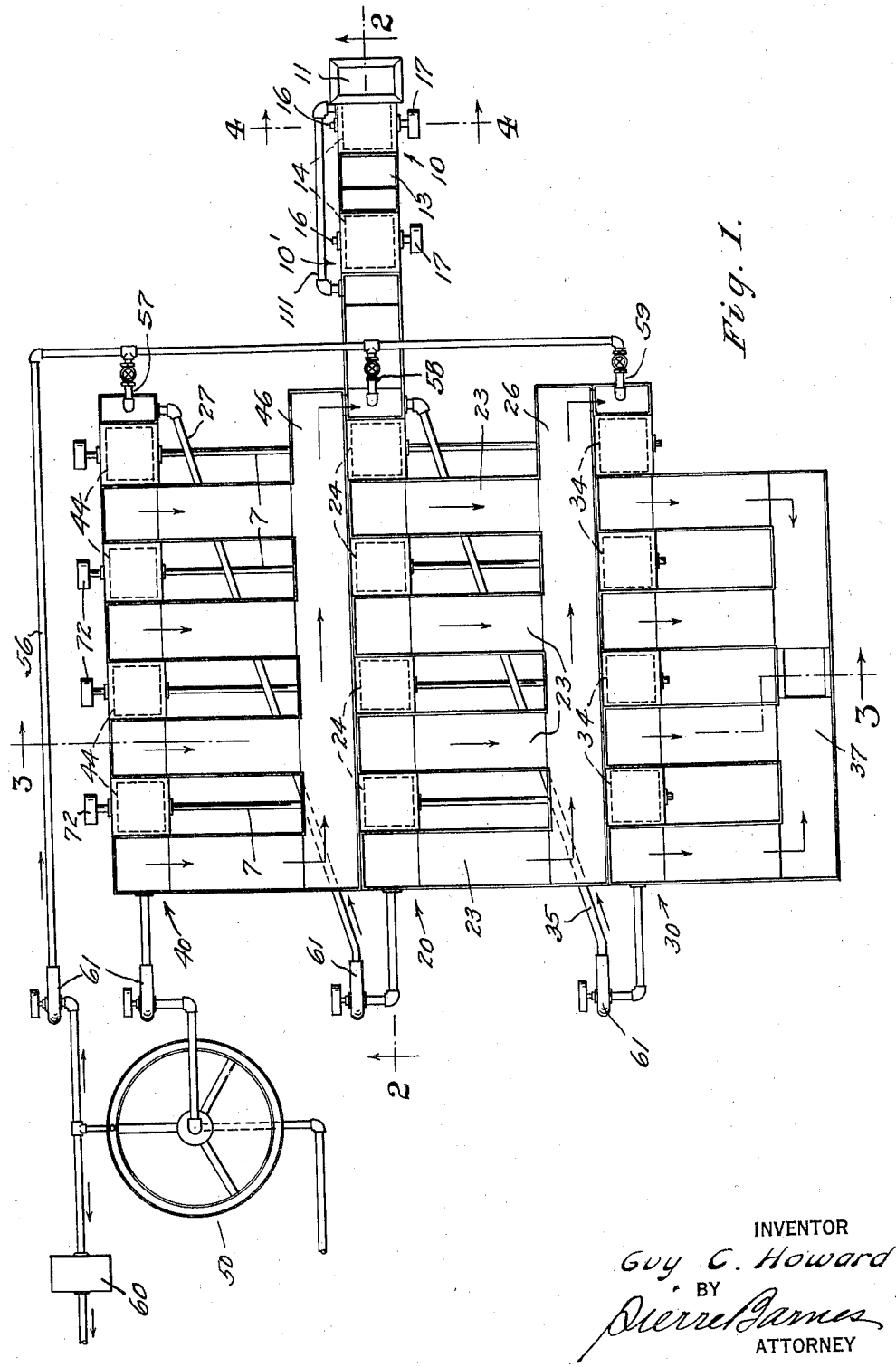

Sept. 1, 1925.

G. C. HOWARD 1,551,882

PROCESS OF UTILIZING WASTE SULPHITE LIQUOR

Filed April 2, 1923 2 Sheets-Sheet 1

INVENTOR
Guy C. Howard
BY
Pierrel James
ATTORNEY

Sept. 1, 1925.
G. C. HOWARD
1,551,882
PROCESS OF UTILIZING WASTE SULPHITE LIQUOR
Filed April 2, 1923 2 Sheets-Sheet 2
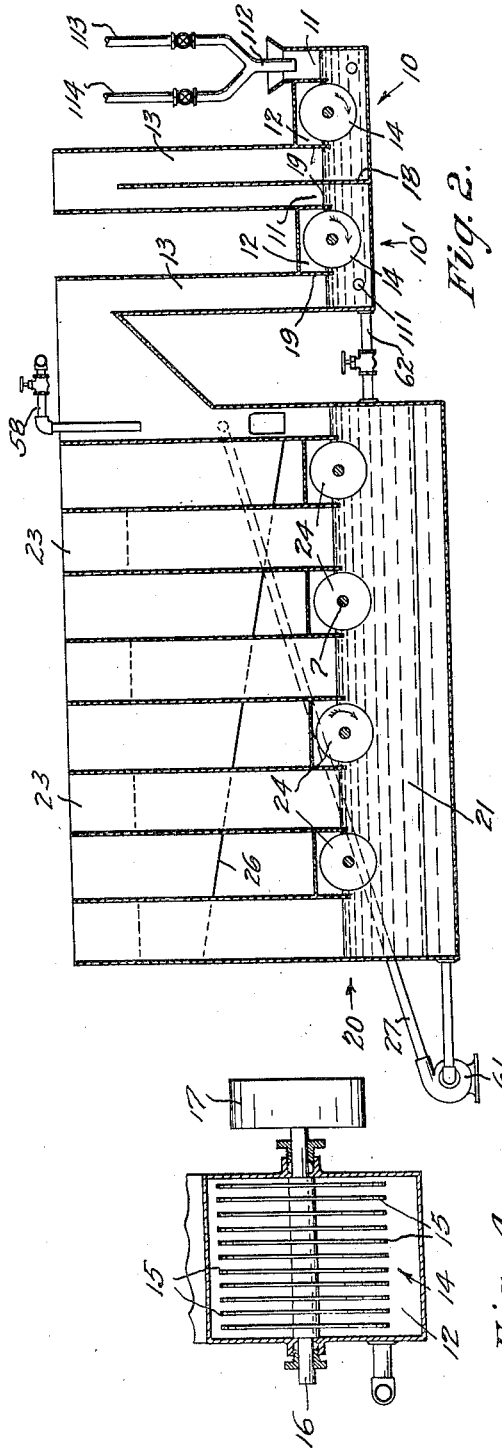
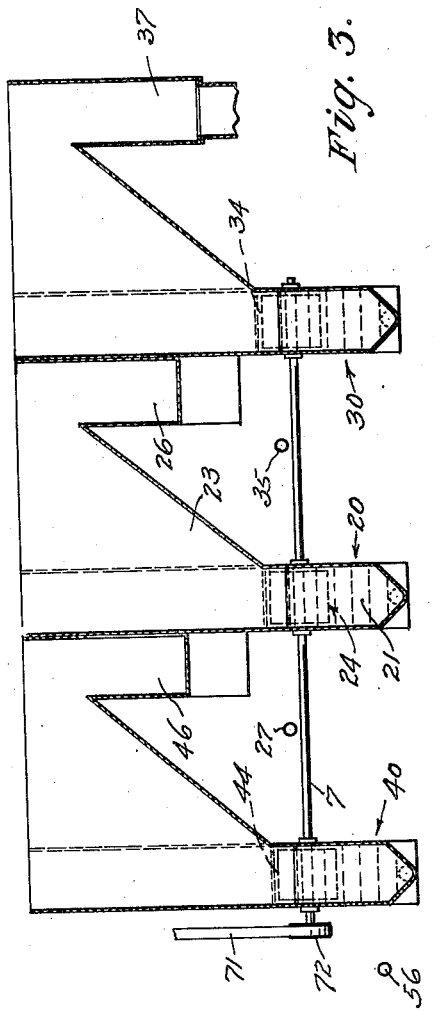
INVENTOR
Guy C. Howard
BY
Pierre Barnes
ATTORNEY Patented Sept. 1, 1925.

1,551,882

UNITED STATES PATENT OFFICE.

GUY C. HOWARD, OF SEATTLE, WASHINGTON.

PROCESS OF UTILIZING WASTE SULPHITE LIQUOR.

Application filed April 2, 1923. Serial No. 629,448.

*To all whom it may concern:*

Be it known that I, GUY C. HOWARD, a citizen of the United States, residing at Seattle, in the county of King and State of Washington, have invented certain new and useful Improvements in Processes of Utilizing Waste Sulphite Liquor, of which the following is a specification.

My invention relates to an improved process of treating waste sulphite liquor resulting from the manufacture of paper pulp by the sulphite process, whereby commercial values are realized therefrom. It consists essentially in precipitating a mixture of organic and inorganic substances from the waste liquor and then segregating such precipitated material into its organic and inorganic constituents and removing both from the residual liquor. Its improvement over existing processes lies in the novel conditions under which the precipitation is effected and the novel method by which the resulting precipitate is segregated into component parts. Its advantages lie in simplicity and economy of operation and an increased yield in products of value.

Waste sulphite liquor is a water solution of non-cellulose substances which have been dissolved from the wood by the process of digestion. The major portion of the material in solution is regarded as a calcium magnesium salt of ligninsulphonic acid. Carbohydrates are also present and are water soluble as such or may exist as soluble addition products formed in the cooking process. As minor constituents there are some resins, oils and proteins and normally some free surphur dioxide.

The digester reactions whereby the non-cellulose constituents of wood are rendered soluble (and hence removable in the waste liquor) are essentially esterification reactions. The reversal of these tends to precipitate dissolved matter in the waste liquor but an equilibrium is quickly established by the products of such reaction. In order to effectively precipitate this waste liquor by saponificatoin reactions certain conditions must be maintained.

Hydrogen ions (H) must be effectively absent. The concentration of hydroxyl ions (OH) must be as high as practical. Sulphite ions ($SO_3$) and sulphate ions ($SO_4$) must be kept as low as possible. Calcium hydroxide (caustic lime) is a commercial reagent that meets such requirements for precipitation, and from a practical standpoint is preferred.

If sufficient quantity of caustic lime is added to the waste liquor a heavy precipitate is formed. This precipitate is a mixture of organic matter and crystals of calcium sulphite, calcium sulphate, and probably some calcium salts of organic acids together with some magnesium hydroxide. The precipitated organic matter (hereinafter referred to as precipitated organics) is probably the lignin constituent of the wood resulting from the saponification reaction on the sulphonic acid combinations in which it exists in the waste liquor. Together with this may be a portion of the carbohydrates carried out of solution mechanically or precipitated by reaction of the reagent on addition products of such carbohydrates existing in the waste liquor.

The calcium sulphite, calcium sulphate and any calcium salts of organic acids, as well as the magnesium hydroxide, are products of the reaction thrown out of solution by their low solubility. These are hereinafter referred to as precipitated inorganics. The residual liquor, i. e., the filtrate, contains some organic matter not precipitated by the reaction and which most likely are carbohydrates of various kinds.

Theoretically the amount of calcium hydroxide necessary to effect such precipitation is an amount equivalent to the calcium in combination with sulphonic acid in the waste liquor plus twice the equivalent of magnesium combined with the sulphonic acid plus enough calcium to neutralize any free sulphur dioxide and other acids existing in the liquor or formed during the reaction plus enough excess to maintain alkaline conditions throughout the operation.

Calcium hydroxide has a low solubility in water and when added to the waste liquor the precipitated organics adsorb to the particles of undissolved lime and retard or stop further action by masking the reagent. This results in an excessive lime consumption unless remedied. The remedy lies in (1) synchronizing the addition of the lime to the waste liquor, that is to say, maintaining conditions that will effect a quick and uniform distribution of the reagent throughout the waste liquor, (2) using finely divided lime so that the size of individual particles is kept at a minimum, and (3) mechanically agitating the mixture during the reaction period so the lime particles are kept free to dissolve by the removal of the adsorbed precipitate from their surfaces. Under these conditions the reactions go to completion with a minimum amount of reagent.

This mass of precipitated matter is of no value unless separated from the residual liquor and thereafter is of little value unless segregated to some extent into its component ingredients. The requirements of this segregation are a substantial separation of the precipitated organics from the precipitated inorganics as above defined.

The organics are a gelatinous precipitate thoroughly dispersed under alkaline conditions. The inorganics are precipitated as fine crystals or amorphous material. On dilution with water the inorganics will settle out quite freely but the organics thereby remain dispersed in a large quantity of liquor and present a difficult problem of recovery by filtration or sedimentation and one which hitherto has not been economically solved by that procedure.

Under mechanical agitation and aeration waste sulphite liquor forms an abundant and relatively permanent froth. The definite conditions at the air-water interface which produce this permanent froth are not known. It may be due to some oil or resinous ingredient of the liquor concentrating in the interface, or it may be the proteins or some of the carbohydrates entering the interface, or it may result from the specific properties of the lignin constituent. The frothing property is a fact, however, and its cause is unimportant to my present invention. Incidentally should the frothing be proven as due to an oil concentration at the interface it would mean an air-oil-water interface rather than an air-water and hence have a bearing on the extent and rapidity of the oxidizing action of air with respect to the waste sulphite liquor under any aeration treatment.

By reason of the conditions above mentioned and as a result of tests, I have discovered that the following described procedure, embodying the principles of my invention, affords results as stated.

(1) By adding a suitable amount of finely divided caustic lime in suspension in a small quantity of water to the waste sulphite liquor and subjecting the mixture to mechanical agitation and aeration, the major portion of the dissolved substances in the waste liquor will be quickly precipitated without the use of an excessive amount of reagent, and substantially the whole charge will be frothed and thus removed from the reaction cells.

(2) Then by diluting such product from these reaction cells with the tail liquor, according to my improved process (as later defined) and subjecting the whole to further mechanical agitation and aeration in a series of so-called rougher cells, a partial separation of the precipitated organics from the precipitated inorganics will be effected by reason of the tendency of the organics to enter and be removed with the froth produced in said cells and the tendency of the inorganics to remain and be removed in the tail liquor discharged from these cells.

(3) By transferring the froth from said rougher cells to a series of froth-cleaner cells and subjecting the froth after suitable dilution, to further mechanical agitation and aeration, the precipitated organics substantially free from inorganics are removed as a low ash froth and the tail liquor from these froth-cleaner cells returned to the inlet of the rougher cells for still further treatment.

(4) Likewise by transferring the tail liquor from said rougher cells to a series of tail cleaner cells in which it is subjected at suitable dilution to further mechanical agitation and aeration the associated organics in this tail liquor can be substantially removed as a froth and cycled back to the feed end of the rougher cells for further treatment and the tail liquor from these tail cleaner cells containing the precipitated inorganics substantially free from organics is withdrawn and the suspended inorganics dewatered by filtration or sedimentation.

(5) The clear liquor so removed from the inorganics is in part returned as cycle liquor for dilution purposes during the several steps of the process as above noted and in part discharged to a sewer or combined with similar liquor resulting from dewatering organic froth and subjected to further treatment or use.

In effect, the above procedure accomplishes the precipitation in the reaction cells under most favorable conditions, since the mechanical agitation and aeration to a froth in these reaction cells affords ideal conditions with regard to economy of reagent and rapidity of reaction.

The subsequent steps are in principle the separation of the precipitated organics from the precipitated inorganics by froth flotation.

The precipitated organic product is thus available as a low ash fuel or for other uses. The precipitated inorganics recovered by my system carry approximately twice as much lime in the form of calcium sulphite and some calcium sulphate as was contained in the original waste liquor. They carry practically all the sulphur content of the waste liquor in the form of calcium sulphite and some sulphate but only about one half of this sulphur is available, without further treatment, for use in making fresh cooking acid.

The magnesium, in the form of magnesium hydroxide, will go in part with the precipitated organics because of some tendency to enter the froth and in part be withdrawn with the precipitated inorganics.

The residual clear liquor withdrawn from the process will predominate in carbohydrates and be suitable for fermentation after acidifying, or for other utilization.

In the accompanying drawings,—

Figure 1 is a plan view of apparatus for carrying out the present invention. Figs. 2, 3, and 4 are vertical sectional views taken substantially on lines 2—2, 3—3 and 4—4, respectively, of Fig. 1.

As illustrated in the drawings, the preferred apparatus comprises four series of cells hereinafter respectively designated as the reaction cells, the rougher cells, the tail cleaner cells, and the froth cleaner cells.

The reaction cells consist of cell units, two 10 and $10^1$ being shown in Fig. 2, each composed of a feed or inlet compartment 11, an agitation and aeration compartment 12 and a discharge compartment, or spitzkasten 13. Provided in each of the agitation compartments 11 is an agitator 14 which, as best shown in Fig. 4, is formed of a plurality of disks 15 mounted in spaced relations with each other upon a horizontal arbor 16. Said agitators are rotated in the directions indicated by arrows thereon by any suitable means as, for example, through the medium of power driven belts, not shown, passing about pulleys 17 provided on the respective arbors. The spitzkasten, or "spitz" as hereinafter termed, intermediate the cell units 10 and $10^1$ is provided with a partition 18 arranged as shown to separate the units.

Baffle partitions indicated by 19 are advantageously employed at opposite sides of the respective agitators to extend to or slightly below the liquid level of the several compartments.

111 represents a by-pass pipe affording communication between the said cells for maintaining the liquid therein at a substantially uniform level. 112 represents a feed pipe having, preferably, branches 113 and 114 through which suitable quantities of waste sulphite liquor and reagent are supplied to the inlet 11 compartment of the first cell unit 10.

Such waste liquor and reagent fed into the first reaction cell unit enters the agitation and aeration compartment 12 thereof and is discharged principally as froth therefrom through the associated spitz 13 into the feed compartment of the second reaction cell unit $10^1$. In these reaction cells the precipitation of the organic and inorganic matter is substantially accomplished under the most favorable conditions.

It is then ready for the next step in the process, namely—the separation of precipitated organics from precipitated inorganics and the subsequent removal of both from the residual liquor, which is effected by a system of classification in the rougher cells, froth cleaner cells, and tail cleaner cells with their accessory parts.

Said rougher cells, designated generally by 20, comprise a series of cell units which are similar to said reaction cell units in the provision of mechanical agitation and aeration appliances, but differing therefrom in two main characteristics: First, a greater cell depth which affords below the elevation of the agitators 24 a settling or sedimentation chamber 21 of relatively large capacity in which the precipitated inorganics tend to accumulate and but a part of the cell content is frothed; and, second, provision is made at the several spitz for withdrawing a regulated amount of froth between the successive cell units and allow progressive travel of the liquid (with the matter suspended therein) to the succeeding units of said rougher cells.

The liquid treated in said rougher cells results in the separation of the same into a froth in which precipitated organics predominate, and a tail liquor which predominates in precipitated inorganics.

Cycle liquor sufficient to maintain a suitable condition of dilution is supplied to said rougher cells through a valved pipe connection 58.

The froth from the rougher cells is discharged through the several spitz 23 thereof, see Figs. 1 and 3, into a trough, or launder 26 by which the froth is delivered into the receiving end of a series of froth cleaner cells, indicated by 30, which are substantially similar to said rougher cells. The froth thus delivered into the cells 30, with a suitable quantity of cycle liquor for diluting the same, is subjected to the action of agitators 34 to effect the mechanical agitation and aeration thereof.

Two products are likewise produced in this operation, one of which is a froth carrying organics, principally, and the other, the residual tail liquor, containing mainly inorganics and some organics, which is returned through a pipe 35 to the receiving end of said rougher cells.

The froth derived from said froth cleaner cells is discharged therefrom through a delivery trough 37 and constitutes after dewatering one of the end products of my process. Such end product contains precipitated organic matter substantially free from inorganics and is probably the lignin constituent of the waste liquor with some carbohydrates, resins, oils and perhaps proteins.

This froth may be conveyed by induced draft appliances (not shown) directly to a furnace for use as fuel or it may be dried by known or suitable means for other uses.

The tail liquor of said rougher cells is withdrawn and delivered from the last cell unit thereof through a pipe line 27 to the feed end of a series of tail-cleaner cells indicated by 40 substantially similar to said rougher and froth cleaner cells and like them the liquor is subjected, under suitable dilution, by agitators 44 to mechanical agitation and aeration to separate the liquor into two products. One of which products is a froth, predominating in organics not removed from the liquor in the rougher cells, and which froth is returned through a launder 46 to the feeding end of said series of rougher cells and toward its ultimate recovery in said froth cleaner cells.

The other product of the tail cleaner cells is a tail liquor in which is suspended inorganics substantially free from organics. The tail liquor from the tail-cleaner cells is delivered to a classifier or sedimentation tank 50, whence the precipitated inorganics are removed as a sludge. The liquor overflow of said classifier is returned, in part, through a pipe line 56 into the feed end of the tail cleaner cells or through the valved outlet 57 or through valved outlets 58 and 59 to the rougher cells and the froth cleaning cells, respectively.

Such returned, or cycle liquor, serves in the respective cells as dilution liquor employed in my process.

60 represents a filter of known or suitable construction through which the liquor continuously withdrawn from the system may be filtered if desired. The liquor thus withdrawn approximates in amount the volume of the original waste sulphite liquor less the water removed with the organic froth which is withdrawn from the apparatus.

61 represents power driven pumps which serve to effect the transfer of the tail liquors between the various series of cells and also between the tail liquor cleaner cells and the classifier 50 as well as delivering the cycle liquor from the latter to the respective series of cells. 62 represents a valved pipe for the passage of liquor between said reaction cells and said rougher cells for the purpose of discharging from the reaction cells a minor portion of liquor not transferred as froth.

For convenience, the agitators 24, 34, and 44 are shown as mounted upon horizontal shafts 7 which are rotated by means of power driven belts, such as 71 Fig. 3, passing about pulleys 72 on the respective shafts, although they may be arranged and driven otherwise.

What I claim, is,—

1. The process of treating waste sulphite liquor, consisting in mechanically agitating and aerating said liquor and simultaneously precipitating a mixture of organic and inorganic matter by means of a reagent and subjecting the resulting product without filtration to further mechanical agitation and aeration whereby the precipitated organic matter substanially free from the precipitated inorganic matter is removed and recovered as a froth and the precipitated inorganic matter substantially free from precipitated organic matter is separated from the residual liquor and recovered.

2. The process of treating waste sulphite liquor, consisting in mechanically agitating and aerating said liquor and simultaneously precipitating a mixture of organic and inorganic matter by the hydroxide of a metal whose salt of sulphurous acid or sulphuric acid is relatively insoluble in water and subjecting the resulting product without filtration to further mechanical agitation and aeration whereby the precipitated organic matter substantially free from the precipitated inorganic matter and recovered is removed and recovered as a froth and the precipitated inorganic matter substantially free from precipitated organic matter is separated from the residual liquor and recovered.

3. The process of treating waste sulphite liquor, consisting in mechanically agitating and aerating said liquor and simultaneously precipitating a mixture of organic and inorganic matter by calcium hydroxide and subjecting the resulting product without filtration to further mechanical agitation and aeration whereby the precipitated organic matter substantially free from the precipitated inorganic matter and recovered is removed and recovered as a froth and the precipitated inorganic matter substantially free from precipitated organic matter is separated from the residual liquor and recovered.

4. The process of treating waste sulphite liquor, consisting in precipitating a mixture of organic and inorganic matter from said liquor and subjecting the resulting product without filtration to mechanical agitation and aeration whereby the precipitated organic matter substantially free from the precipitated inorganic matter is removed and recovered as a froth and the precipitated inorganic matter substantially free from precipitated organic matter is separated from the residual liquor and recovered.

5. The process of treating waste sulphite liquor, consisting in precipitating a mixture of organic and inorganic matter from said liquor and subjecting the resulting product to aeration whereby the precipitated organic matter substantially free from the precipitated inorganic matter is removed and recovered as a froth and the precipitated inorganic matter substantially free from precipitated organic matter is separated from the residual liquor and recovered.

6. The process of treating waste sulphite liquor, consisting in precipitating a mixture of organic and inorganic matter from said liquor and subjecting the resulting product without filtration to aeration whereby the precipitated organic matter substantially free from the precipitated inorganic matter is removed and recovered as a froth and the precipitated inorganic matter substantially free from precipitated organic matter is separated from the residual liquor and recovered.

7. The process of precipitating and recovering products from waste sulphite liquor by the use of froth producing means and maintaining alkaline conditions with respect to the liquor throughout the operation.

8. The herein described process of utilizing waste sulphite liquor, consisting in adding a reagent to the waste liquor, then mechanically agitating and aerating the mass to froth the same to assist precipitation and to effect the separation of precipitated inorganic matter from precipitated organic matter thereof, removing the greater part of the organic matter as a froth, and finally recovering the inorganic matter from the residual liquor.

9. In a process of treating waste sulphite liquor, the precipitating in alkaline solution of a mixture of organic and inorganic matter from said liquor under conditions that permit of the major portion of the reaction taking place at a gas-liquor interface resulting from mechanical agitation and aeration.

10. In a process of treating waste sulphite liquor, the precipitating of a mixture of organic and inorganic matter from said liquor under conditions that permit of the major portion of the reaction taking place at a gas-liquor interface resulting from mechanical agitation and aeration and then approximately separating the resulting products into precipitated organic matter which is removed as a froth and precipitated inorganic matter and residual liquor.

Signed at Seattle, Washington, this 26th day of March 1923.

GUY C. HOWARD.